United States Patent [19]

Moribe et al.

[11] Patent Number: 4,490,662
[45] Date of Patent: Dec. 25, 1984

[54] POSITIONING METHOD AND APPARATUS THEREFOR

[75] Inventors: Yoshihiro Moribe, Chigasaki; Yukitaka Hayashi; Masahiro Mitamura, both of Odawara, all of Japan

[73] Assignee: Hitachi, Ltd., Tokyo, Japan

[21] Appl. No.: 517,813

[22] Filed: Jul. 27, 1983

[30] Foreign Application Priority Data

Sep. 3, 1982 [JP] Japan .................................. 57-152723
Sep. 3, 1982 [JP] Japan .................................. 57-152724

[51] Int. Cl.$^3$ .............................................. H02K 29/04
[52] U.S. Cl. ...................................... 318/685; 318/696
[58] Field of Search ................. 318/685, 696; 360/106, 360/78

[56] References Cited

U.S. PATENT DOCUMENTS

| | | | |
|---|---|---|---|
| 3,882,541 | 5/1975 | Ghose et al. | 360/78 |
| 4,263,632 | 4/1981 | Burke, Jr. et al. | 360/106 |
| 4,418,370 | 11/1983 | Harrison | 360/106 |
| 4,423,447 | 12/1983 | Nishida et al. | 360/106 |

Primary Examiner—S. J. Witkowski
Assistant Examiner—Saul M. Bergmann
Attorney, Agent, or Firm—Antonelli, Terry & Wands

[57] ABSTRACT

A positioning method and apparatus for precisely positioning a magnetic head on a desired track of a magnetic disc includes stepping motor having a plurality of stationary pole windings adapted to be rotated stepwise, and a mechanism for moving the magnetic head by a rotational movement of the stepping motor. By rotating the stepping motor stepwise by an integral multiple of the number of stationary pole windings of the stepping motor, the magnetic head is moved by one track width of the magnetic disc. By driving the stepping motor by the integral multiple of the number of stationary windings, the magnetic head is positioned by the same stationary pole windings without being affected by an assembling tolerance of the stationary pole windings. The stepping motor may also be driven so as to overrun a desired track by at least one step and then rotated in a reverse direction by the same number of steps so that a positioning error due to forward and reverse rotations of the stepping motor is eliminated.

22 Claims, 13 Drawing Figures

POSITIONING METHOD AND APPARATUS THEREFOR

The present invention relates to a positioning method and apparatus, and more particularly to a positioning method and apparatus for precisely positioning a magnetic head to a record medium in a magnetic disc device or a flexible disc device.

The magnetic disc device or the flexible disc device usually has a head positioning mechanism for precisely positioning the magnetic head to a track on a record medium. The head positioning mechanism positions the magnetic head to a hard disc by, for example, linearly moving or rotating the magnetic head by a voice coil motor. A positioning mechanism for positioning a magnetic head to a flexible disc record medium has a stepping motor for rotational movement, a steel belt wrapped around a capstan of the stepping motor, a carriage having the opposite ends of the steel belt fixed thereto and a guide rail for guiding the carriage radially of the flexible disc. The positioning mechanism converts the rotational movement of the stepping motor to a linear movement by the steel belt to position the magnetic head mounted on the carriage, which is guided by the guide rail, to the track on the flexible disc. A positioning mechanism of the aforementioned type is disclosed in, for example, U.S. Pat. Nos. 4,170,146 and 4,161,004, and the positioning mechanism which uses a lead screw is disclosed in, for example, U.S. Pat. Nos. 3,678,481 and 3,879,757.

However, the magnetic head positioning mechanism which uses the voice coil motor requires a large size voice coil motor to generate a motive force and hence the positioning mechanism is of large size and expensive. With a positioning mechanism which uses the stepping motor and steel belt, it is difficult to position the magnetic head on the track on the high density recorded disc because a rotational angular precision of the stepping motor includes a positioning error of ±3%~±5% per step. Further, due to a hysteressis effect of the stepping motor, a positioning of the magnetic head by a clockwise rotation of the motor and positioning by a counterclockwise rotation do not coincide, a precise positioning of the magnetic head is difficult to attain.

It is an object of the present invention to provide a positioning method and apparatus for precisely positioning a workpiece such as a magnetic head by a simple and light construction.

Another object of the present invention resides in providing a positioning method and apparatus for precisely positioning a workpiece while eliminating a positioning error due to a rotation angle precision of a stepping motor.

Yet another object of the present invention resides in providing a positioning method and apparatus capable of eliminating a positioning error due to the direction of rotation of the stepping motor.

In order to achieve the above objects, in accordance with the positioning method and apparatus of the present invention, the stepping motor is driven by that number of stepping motor driving current pulses which is determined by multiplying the number of pitches required for the workpiece to be positioned to a desired position with the number of stationary pole windings of the stepping motor.

The above and other objects, features and advantages of the present invention will become more apparent from the following detailed description of the preferred embodiments of the invention taken in connection with the accompanying drawings, in which.

Figure 1:
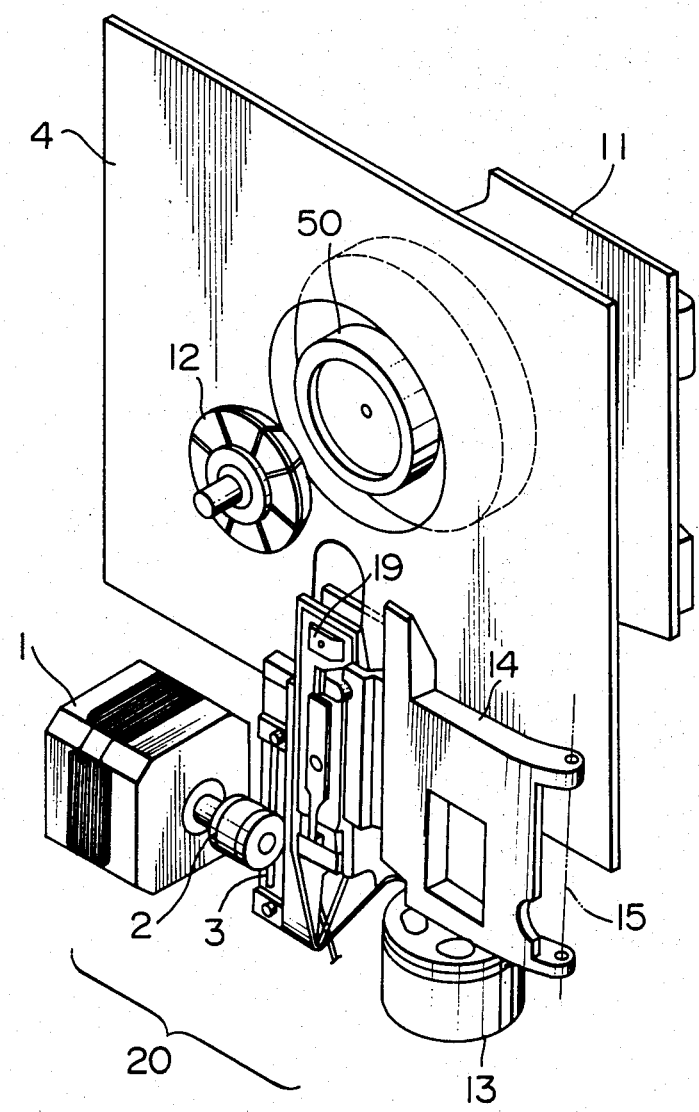
FIG. 1 is an overall partially schematic perspective view of a flexible disc device to which the present invention is applied.

Referring now to the drawings wherein like reference numerals are used throughout the various views to designate like parts and, more particularly, to FIG. 1, according to this figure, a flexible disc device comprises a spindle 50 rotated by a motor (not shown), a collet 12 for mounting a flexible disc 4 to the spindle 50, a head positioning mechanism 20, a stepping motor 1 for driving the positioning mechanism 20 radially of the disc 4, a rotary member 14 for loading and unloading a magnetic head 19 of the positioning mechanism to and from the flexible disc 4, a rotary solenoid 13 for rotating the rotary member 14 around a shaft 15, and a control circuit 11 for controlling the respective electrical elements.

The stepping motor 1 drives the head positioning mechanism 20 while the flexible disc 4 is mounted to the spindle 50 by the collet 12 so that the magnetic head 19 is positioned, and the rotary solenoid 13 rotates the rotary member 14 to load and unload the magnetic head 19 mounted on the positioning mechanism 20.

Figure 2:
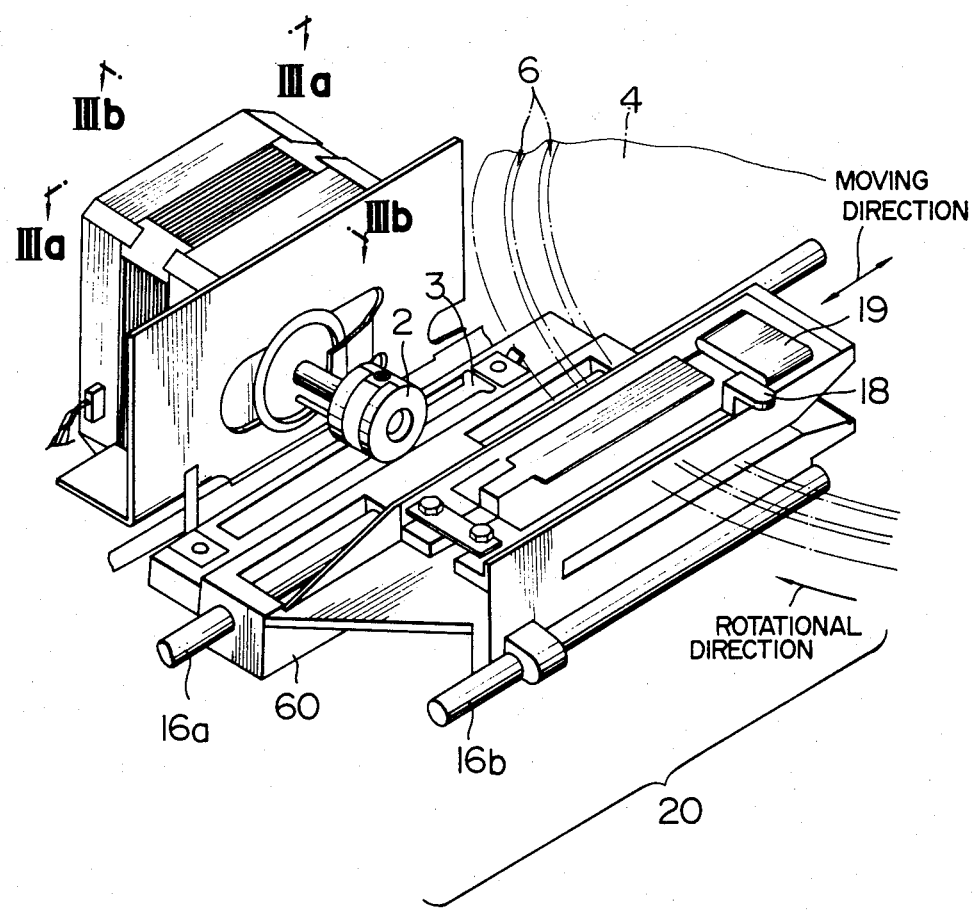
FIG. 2 is a perspective view of a portion of the magnetic head positioning mechanism of FIG. 1.

As shown most clearly in FIG. 2, the positioning mechanism 20 comprises a carriage block 60 which carries the magnetic head 19 and is movable along the guide arms 16a and 16b, a steel belt 3 wrapped around the guide arm 16a on the carriage block 60, with opposite ends thereof fixed in tension, and a capstan 2 around which the steel belt 3 is wrapped and which is rotated in synchronism with the shaft of the step motor 1.

As the stepping motor 1 is rotated and the steel belt 3 wrapped around the capstan 2 of the stepping motor 1 is wound and unwound, the rotational movement of the stepping motor 1 is translated to a linear movement of the carriage block 60 along the guide arms 16a and 16b. By the linear movement of the carriage block 60, the magnetic head 19 mounted at one end of the block 60 is positioned to a desired track 6 on the flexible disc 4.

Figure 3A:
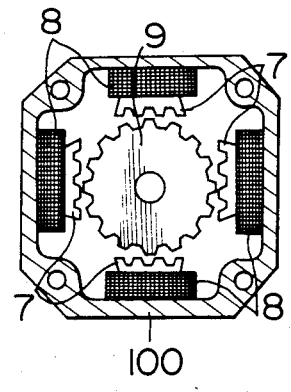
FIG. 3a is a cross sectional view of a stepping order taken along the line IIIa—IIIa in FIG. 2.
Figure 3B:
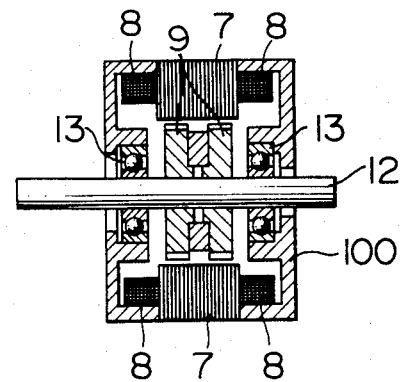
FIG. 3b is a cross-sectional view of the stepping motor taken along the line IIIb—IIIb of FIG. 2.

As shown in FIGS. 3a and 3b, the stepping motor 1 comprises a rotary pole 9, stationary poles 7 and stationary pole windings 8 arranged around the rotary pole 9 at an interval of 90 degrees, a rotary bearing 13 for rotatably supporting a motor shaft 12 of the rotary pole 9 and a block 100 which surroundingly holds the poles 7, 9 and the bearing 13. By selectively exciting the stationary pole windings 8, the rotary pole 9 is rotated so that the shaft 12 effects the rotational movement. When a four-phase stepping motor having four stationary poles 7 and four stationary pole windings 8 is driven in a two-phase excitation system, the same stationary pole winding 8 is excited for every four steps of the stationary poles 7 of the stepping motor 1.

However, because of a circumferential arrangement angular error of the stationary poles 7, a centering error of the stationary poles 7 and the rotary pole 9, and nonuniformity of the exciting current of each of the stationary pole windings 8, the angular position of each step of the stepping motor 1 includes an angular error.

Figure 4:
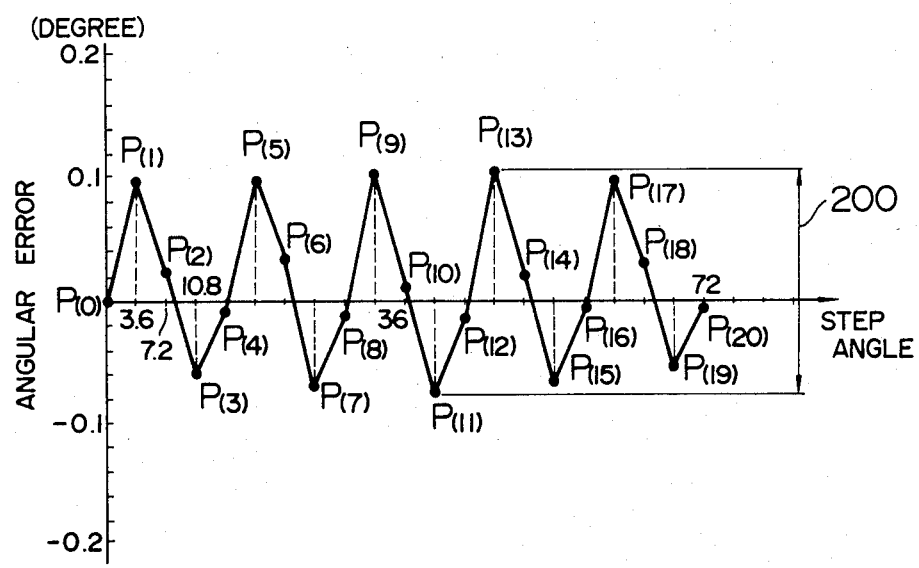
FIG. 4 illustrates a positioning method in which a magnetic head is moved one track for every one step of the stepping motor shown in FIGS. 3a and 3b.

As shown in FIG. 4, when the stepping motor 1 is rotated by one step (3.6 degrees) from a reference angle (0 degree shown by point P(0), a rotation angular error is approximately +0.1 degree as shown by a point P(1), and when the stepping motor 1 is further rotated by one step (3.6 degrees), the error is approximately +0.02 degree as shown by a point P(2). As the stepping motor 1 is rotated stepwise, the error changes to approximately −0.06 degree and −0.01 degree as shown by points P(3) and P(4). The error of the stepping motor 1 varies in accordance with a period of a four-step rotation.

While it was contemplated to move the magnetic head 19 by one track width of the flexible disc 4 for every one-step rotation of the stepping motor 1, it was determined that the stepping motor 1 produced an angular error of approximately ±0.1 degree as shown by an error range 200. This error corresponds to an error of approximately ±3% in the stepping motor 1 having one-step angle of approximately 3.6 degrees. Thus, it is not suitable for the high precision positioning of the magnetic head 19.

It has also been determined that the substantially same positioning error occurs for every one revolution of the stepping motor 1. Consequently it is necessary for the magnetic head positioning method and apparatus to have a very small positioning error which may be accomplished by moving the magnetic head 19 by one track width for every four-step drive of a stepping motor 1 having four stationary poles 7.

Figure 5:
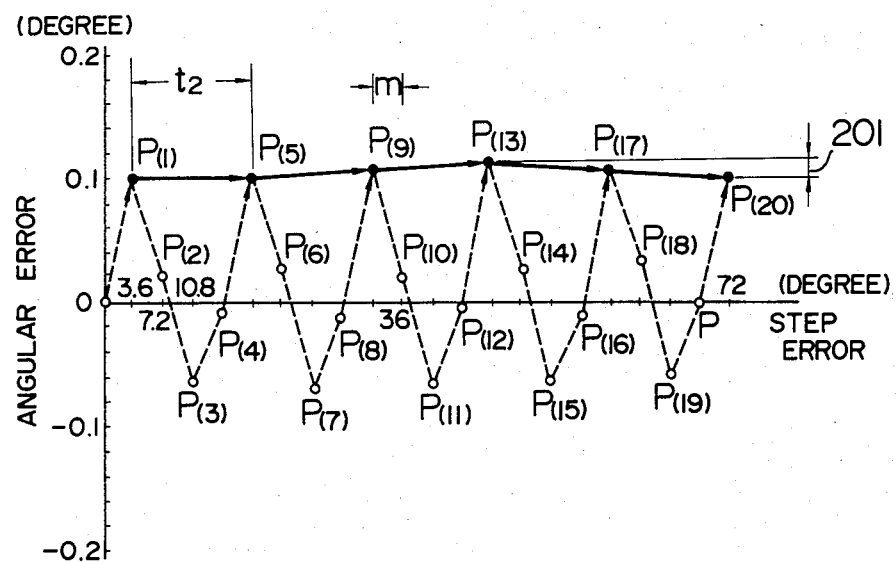
FIG. 5 illustrates a positioning method in which the magnetic head is moved one track for every four steps of a stepping motor in accordance with one embodiment of the present invention.

As shown in FIG. 5, a point P(1), which corresponds to the angle (3.6 degrees) after one-step rotation of the stepping motor 1, is taken as a reference point, and the magnetic head 19 is positioned at every four-step rotation point from the reference point P(1) such as points P(5), P(9), P(13) and P(17). The magnetic head 19 traces a path shown by a broken line in FIG. 5 but it is positioned at the points marked with dots (·). Thus, the magnetic head 19 is apparently moved along a solid line and the positioning angular error 201 is suppressed to be approximately 0.02 degree or less.

The positioning angular error can be suppressed to be so small because the positioning is accomplished by using the stationary pole windings 8 of the same condition. Even when the positioning is effected for every four steps 1 as shown in FIG. 5, the positioning error 201 is included; however, this is mostly due to a variation of a tooth shape tolerance of the rotary pole 9 and is so small that it sufficiently satisfies the allowance (±1%) of the positioning error.

Figure 6:
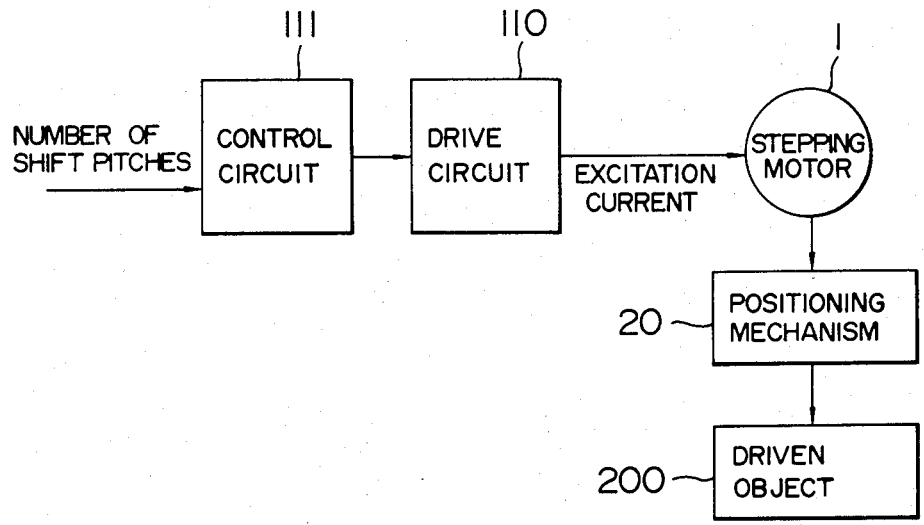
FIG. 6 is a drive circuit in accordance with one embodiment of the present invention for driving the stepping motor shown in FIG. 5.
Figure 7:
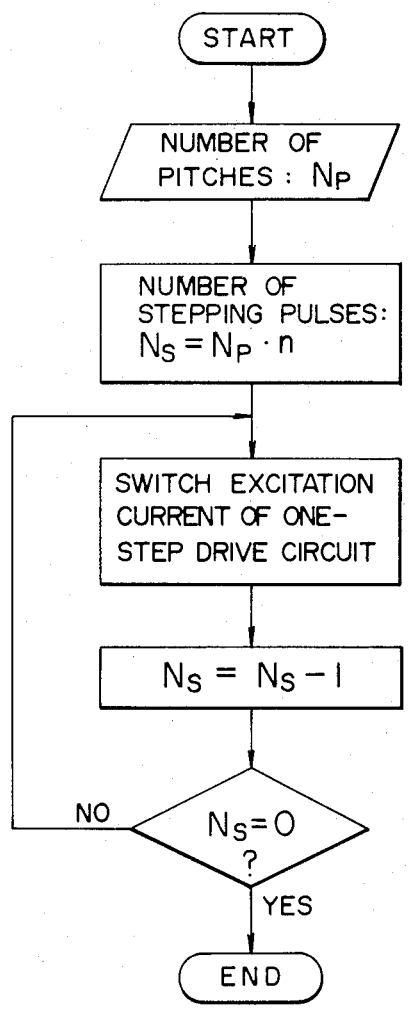
FIG. 7 is a flow chart of the drive operation of the control circuit of FIG. 6.

As shown in FIG. 6, the positioning drive unit comprises a control circuit 111 for controlling a drive circuit 110 in accordance with the input number of track pitches to be traversed, with the drive circuit 110 driving the stepping motor 1 by a drive or excitation current under the control of a control circuit 111. A driven object 200, for example, the magnetic head is driven by the rotation of the stepping motor 1 through the positioning mechanism 20. As shown in a flow chart of FIG. 7, the control circuit 111 multiplies the number of pitches $N_p$ by the number of stationary pole windings n and activates the drive circuit 110 until the product or the number of stepping pulses $N_s$ reaches zero so that the driven object 200 is positioned.

In the magnetic head positioning mechanism of the present invention, the diameter of the capstan 2 is small because the stepping motor 1 is rotated at a higher rotational speed than the prior art.

Figure 8:
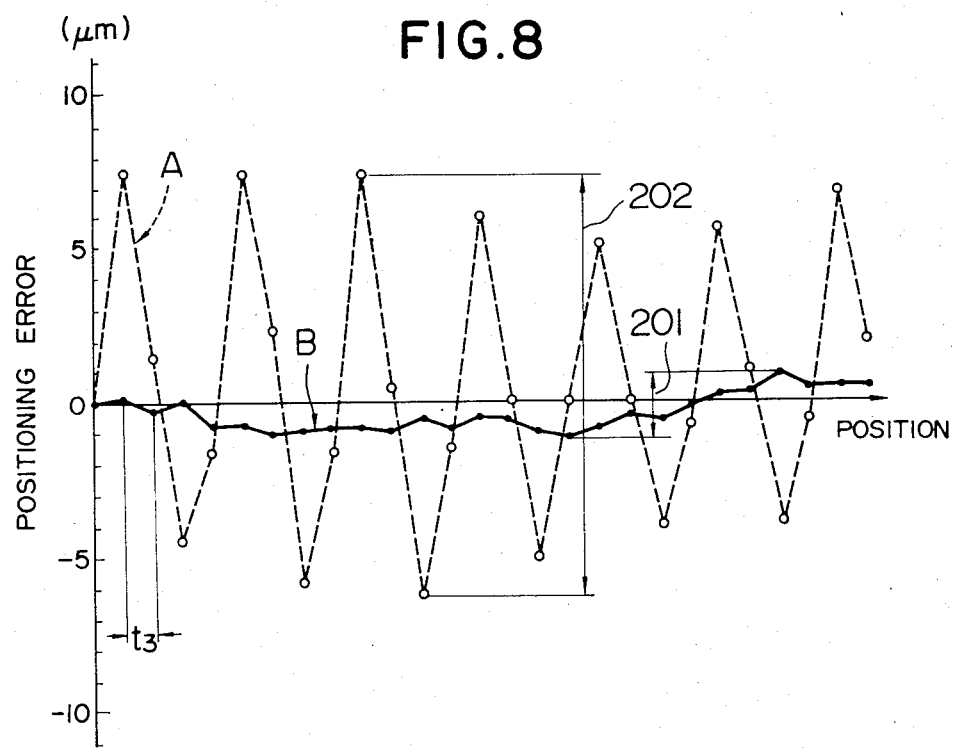
FIG. 8 illustrates a positioning precision in the present invention.

FIG. 8 provides an illustration of a relationship between the positions of the magnetic head 19 positioned by the present invention and the prior art mechanism and the positioning error. More particularly, a broken line A represents the prior art positioning which includes a positioning error width 202 of approximately 13.7 μm for a positioning pitch $t_3$ of approximately 265 μm, while a line B represents the positioning by the present invention which includes an error width 201 of approximately 2.1 μm, approximately one seventh of that of the prior art.

The stepping motor has a feed pitch of 3.6 degrees for one step although the present invention is not limited thereto. For example, a stepping motor 1 having a minimum feed pitch of 0.9 degree may be used and the positioning may be at every four-step rotation. In this case, the diameter of the capstan 3 of the stepping motor 1 is same as that of the prior art mechanism. While the magnetic head 19 is positioned at every four steps in the above embodiment, the positioning may be effected at every integral multiple of the number of stationary pole windings 8 of the stepping motor 1 such as, for example, at every eight steps.

According to the embodiments described above, the positioning error of the magnetic head can be reduced.

Figure 9:
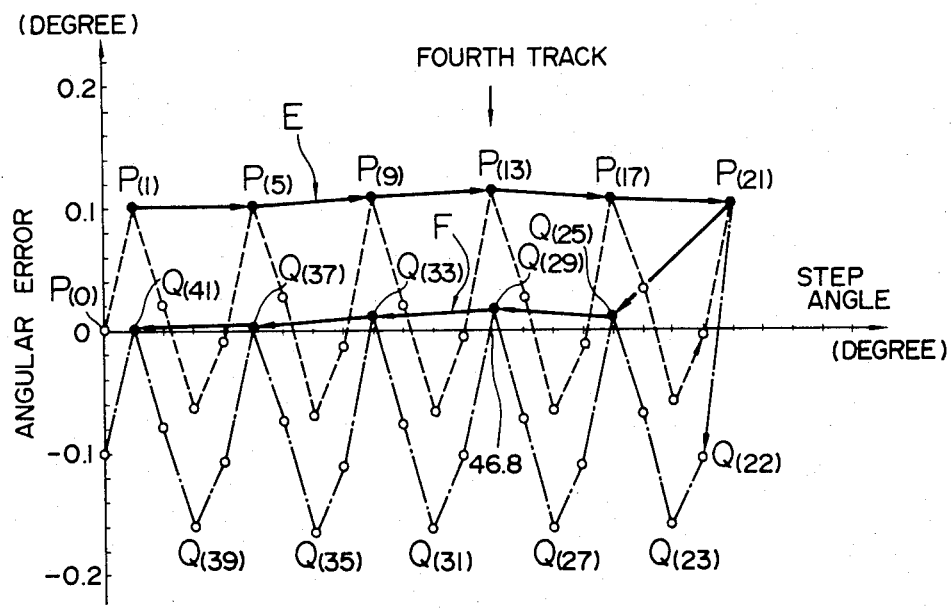
FIG. 9 illustrates a relationship between a rotation step angle of a stepping motor and a displacement of an angular error due to an angular displacement.

The inventors constructed a flexible disc device in accordance with the above embodiments and to measure the positioning precision of the magnetic head a flexible disc drive was constructed and it was determined that when the magnetic head 19 was positioned by rotating the stepping motor 1 in one direction, the positioning error was be reduced however, a problem arose when the stepping motor 1 was rotated in the opposite direction and then rotated in the first direction to position the magnetic head 19 to the original position since the magnetic head was not positioned at the same position. Thus, it was determined that the position of the magnetic head 19 positioned by the forward rotation of the stepping motor did not coincide with the position of the magnetic head 19 positioned by the reverse rotation of the stepping motor 1. The cause of the above-mentioned problem regarding the positioning of the magnetic head 19 can best be understood by considering the relationship illustrated in FIG. 9. More particularly, if the stepping motor 1 is rotated one step to a reference point P (1) and then sequentially rotated from the reference point P (1) and the positioning is effected at every four-step points, namely, P(5), P(9), P(13), P(17) and P(21), the positioning angular error of the stepping motor 1 is maintained at approximately 0.1 degree as shown by the arrows E. When the stepping motor 1 is rotated in a reverse direction from the point P(21) and the positioning is effected at every four steps, the angular error is maintained at approximately zero degrees as shown by arrows F emanating from points $\theta(25)$, $\theta(29)$, $\theta(33)$, $\theta(37)$ and $\theta(41)$, because of the hysteresis of the stepping motor 1. Thus, the position of the magnetic head 19 positioned by the forward rotation of the stepping motor 1 differs from that positioned by the reverse rotation of the stepping motor 1. For example, when it is desired to position the magnetic head 19 to a position of step angle of 46.8 degrees corresponding to the fourth track, the angular error at the point P(13,) when the positioning is effected by a forward rotation of the stepping motor 1 from the point P(1) is approximately 0.11 degrees, while the angular error at the point $\theta(29)$ when the positioning is effected by a reverse rotation of the stepping motor 1 is approximately 0.2 degree. Thus, there is an error of approximately 0.9 degree therebetween leading to a degradation of the reproducibility of the magnetic head positioning.

According to the magnetic head positioning method of the present invention, when the positioning is to be effected by a forward rotation of the stepping motor 1, the stepping motor 1 is overrun by one step from a desired position and rotated in reverse by one step so that a position correction is accomplished by utilizing position shifts in forward and reverse directions due to the hysteresis. In this manner, the magnetic head 19 is positioned at substantially the same position in both the forward and reverse rotation of the stepping motor 1, a control circuit 111 drives the stepping motor 1 which, in turn, drives the positioning mechanism 20 such that it is overrun by one step and then rotated reversely by one step.

Figure 10:
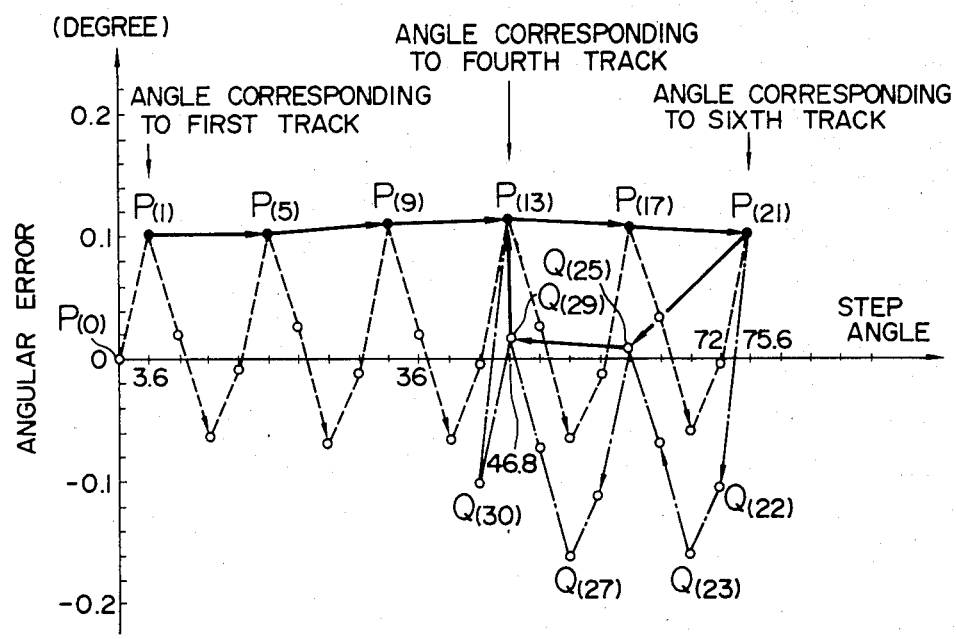
FIG. 10 illustrates a relationship between a rotation step angle of a stepping motor and a displacement of an angular error for explaining an positioning method of one embodiment of the present invention.
Figure 11:
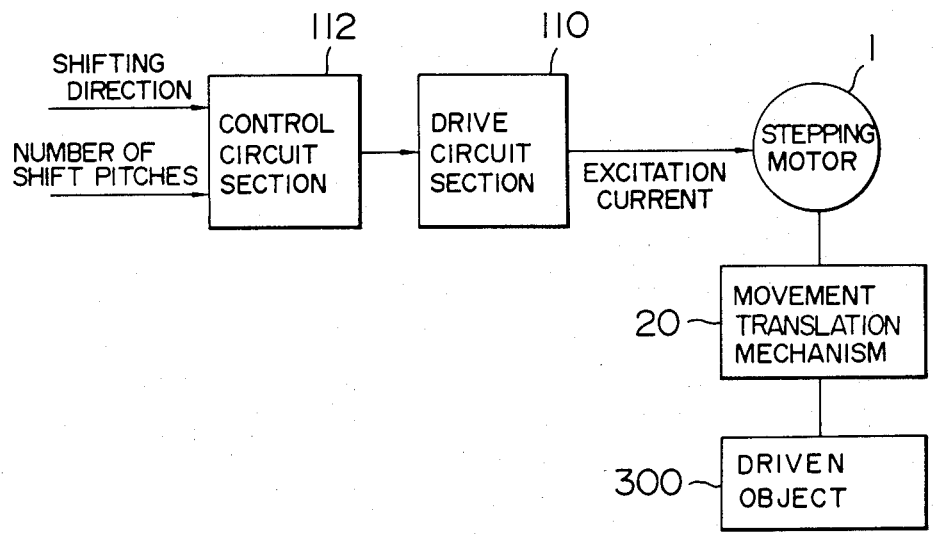
FIG. 11 is a block diagram for implementing the positioning method of the embodiment of FIG. 10.

In FIGS. 10 and 11, it is assumed that the stepping motor 1 is rotated in a forward direction such that the magnetic head 19 is moved from a first track of the flexible disc 4 to fourth and sixth tracks and then the stepping motor 1 is reversed such that the magnetic head 19 is again positioned to the fourth track.

When the magnetic head 19 is moved from the first track of the flexible disc, i.e., 3.6 degrees position P(1), to the fourth track, the stepping motor 1 is rotated by twelve steps to a position P(13) along a broken line. An error from the desired rotation angle of 46.8 degrees at the point P(13) is approximately +1.1 degrees. The stepping motor 1 is rotated in a reverse direction to again position the magnetic head 19 to the fourth track. With the present invention, the stepping motor is rotated in a reverse direction by steps from the point P(21) to a point Q(30) along the chain line and then the stepping motor 1 is rotated in the forward direction by one step to the point P(13). Thus, with the present invention, the stepping motor 1 is overrun by one step from the destination rotation angle and then reversely rotated by one step.

As a result, the angular error included when the stepping motor 1 is rotated in the forward direction from a smaller step angle and the angular error included when the stepping motor 1 is rotated in the reverse rotation from a larger step angle are substantially equal and the reproduceability of the magnetic head positioning is enhanced. While the magnetic head is overrun by one step and then reversed by one step, it is understood that the present invention is not limited thereto. The stepping motor 1 may be excited to overrun past the magnetic head 19 and then be oppositely excited before the magnetic head 19 is positioned so as to increase the positioning speed of the magnetic head 19.

Figure 12:
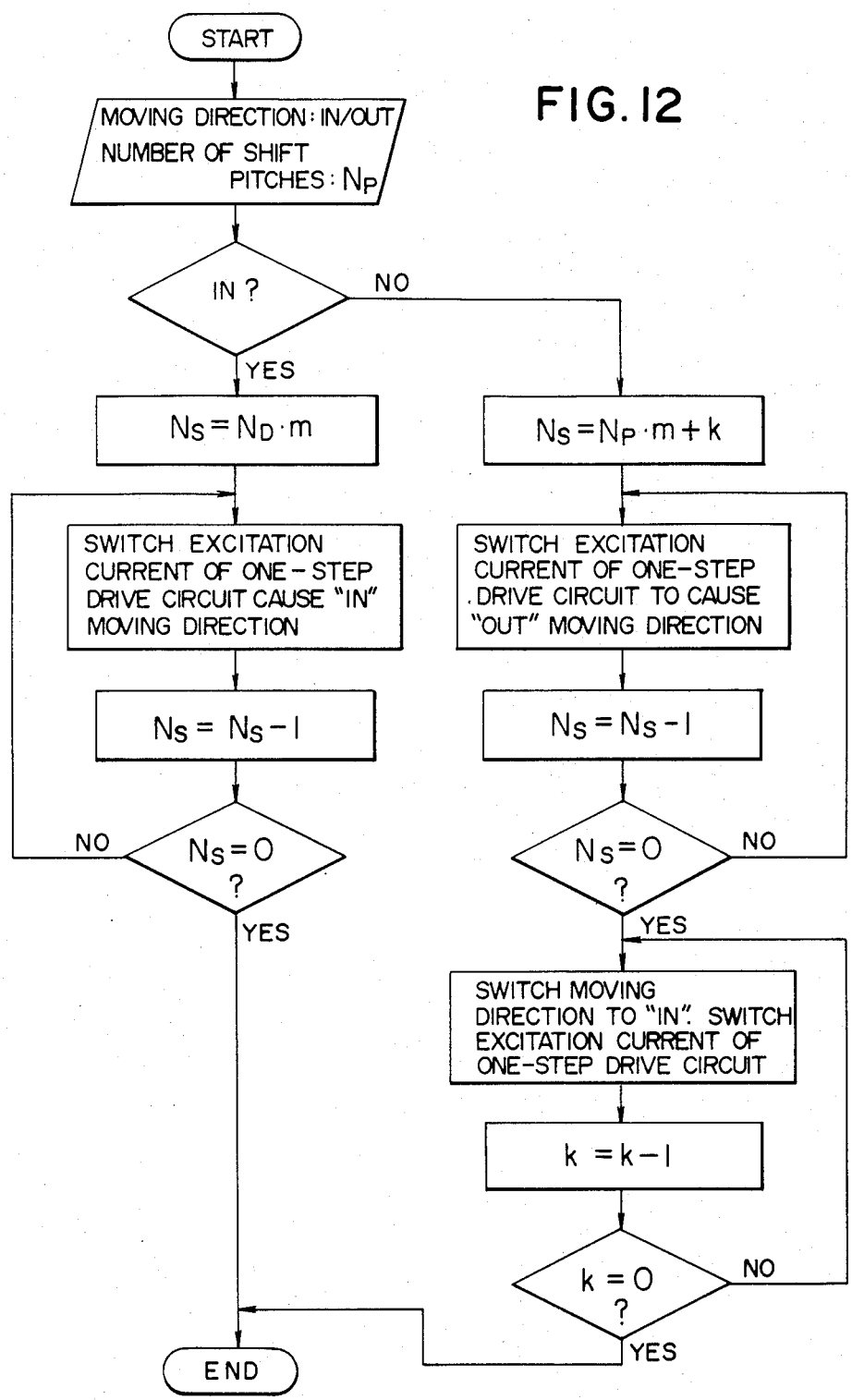
FIG. 12 is a flow chart of the operation of a control circuit used in the embodiment of FIG. 11.

As shown in FIG. 11, the shift direction and the number of shift pitches are externally supplied to the control circuit 112, which, in turn, supplies a signal to the drive circuit 110 as shown most clearly in FIG. 12. The drive circuit 110 switches an excitation current supplied to the stepping motor 1 to rotate the stepping motor shaft, and the rotational movement of the shaft is translated to a linear movement by the positioning mechanism 20 to move a driven object 300 such as, for example, a magnetic head.

In accordance with a positioning pitch ratio m and the number of oversteps k under a given condition, the required number of step pulses $N_p$ and the number of oversteps k are produced without conflicting the logic shown in FIG. 12. The movement directions IN and OUT may be exchanged in the flow chart of FIG. 12, with positioning pitch ratio m being defined by positioning pitches P/stepping motor feed pitches P.

While the present invention has been described in connection with the disc device shown in FIG. 1, the present invention is also applicable to a positioning mechanism having a lead screw which utilizes a stepping motor as a drive source. A positioning mechanism having a lead screw comprises a lead screw which rotates in syncronism with a stepping motor, with a cylindrical outer periphery of the lead screw extending radially of a magnetic disc and having a groove or projection of a helical shape on the cylindrical outer periphery, a carriage supports the magnetic head 19 and has a projection or groove to be engaged with the groove or projection provided on the lead screw. A guide rail is provided for guiding the carriage radially of the magnetic disc, whereby, upon a rotation of the lead screw, driven by the step motor, the carriage, the projection or groove of which engages with the groove or projection provided on the lead screw, moves along the guide rail radially of the magnetic disc. The basic structure of such positioning mechanism is described in above noted U.S. Pat. No. 3,678,481, and the present invention may be implemented by driving the step motor of this structure such that the same stationary pole winding is excited for positioning as in the case of the invention described hereinabove, or, the overrunning and backing may be utilized when exciting the same stationary pole winding for positioning.

The present invention is also applicable to a positioning mechanism having a looped steel belt utilizing a step motor as a source of driving, or to a positioning mechanism of a rotary access type such as described in U.S. Pat. No. 3,946,439 or No. 4,161,004, and the present invention is implemented by driving step motors utilized in these mechanisms in the same manner as described hereinabove.

In the head positioning method and apparatus of the present invention, the magnetic head 19 is positioned at every four steps of the stepping motor 1. In a positioning mechanism which positions the magnetic head 19 by one track width at every one step, the stepping motor 1 may be overrun by one step and then rotated in a reverse direction by one step thereby enabling a relatively high precision positioning of the magnetic head 19.

We claim:

1. A positioning method for a positioning apparatus including a stepping motor having a plurality of rotary poles mounted on a rotatable motor shaft, a plurality of stationary poles, and a plurality of stationary pole windings arranged around said rotary poles, said motor shaft being rotated stepwise each time said stationary pole windings are supplied with pulse currents, a translation means for translating a rotary movement of said motor shaft of said stepping motor to a linear movement, and a driven object adapted to be moved by a predetermined number of pitches by the linear movement of said translation means, the method comprising the steps of:

multiplying the number of pitches required for positioning said driven object to a desired position by an integral multiple of the number of said stationary poles windings of said stepping motor to calculate a number of pulses for driving said stepping motor; and applying the calculated number of pulses to said stepping motor to position said driven object to the desired position.

2. A positioning apparatus for positioning a driven object by translating a rotational movement of a stepping motor having a motor shaft rotated stepwise in response to an application of a pulse current to a linear movement to move said driven object a predetermined number of pitches;

the stepping motor including a plurality of rotary poles mounted on a rotatable motor shaft, a plurality of stationary poles, and a plurality of stationary pole windings arranged around said rotary poles for rotating the motor shaft stepwise by a predetermined angle in response to the application of the pulse current to said stationary windings;

translation means for translating a rotational movement of the motor shaft of said stepping motor to a linear movement;

a control circuit means for multiplying the number of pitches required for the driven object to be positioned to a desired position by the number of stationary pole windings of said stepping motor to calculate the number of pulses to drive said stepping motor and for applying the calculated number of pulses to said stationary pole windings of said stepping motor to drive said stepping motor, whereby the driven object is linearly moved a predetermined number of pitches by the linear movement of said translation means.

3. A positioning method for a positioning apparatus including a stepping motor having a plurality of rotary poles mounted on a rotatable motor shaft, a plurality of stationary poles, and a plurality of stationary pole windings arranged around said rotary poles, the motor shaft being rotated stepwise each time said stationary pole windings are supplied with pulse currents, a translation means for translating a rotary movement of said motor shaft to a linear movement, and a driven object adapted to be moved by a predetermined number of pitches by the linear movement of said translation means, the method comprising the steps of:

multiplying the number of pitches required for the driven object to be positioned to a desired position by an integral multiple of the number of said stationary pole windings of said stepping motor to calculate the number of pulses for driving said stepping motor; and applying the calculated number of pulses plus a predetermined number of pulses to said stepping motor to move the driven object beyond the desired position and then rotating said stepping motor in a reverse direction by said predetermined number of pulses to position said driven object at said desired position.

4. A positioning apparatus for positioning a driven object by translating a rotational movement of a stepping motor having a motor shaft rotated stepwise in response to an application of a pulse current to a linear movement to move said driven object by a predetermined number of pitches;

the stepping motor includes a plurality of rotary poles mounted on the motor shaft, a plurality of stationary poles, and a plurality of stationary pole windings arranged around said rotary poles for rotating said motor shaft stepwise by a predetermined angle in response to an application of pulse currents to said stationary windings;

translation means for translating a rotational movement of said motor shaft of said stepping motor to a linear movement;

a control circuit means for multiplying the number of pitches required for the driven object to be positioned to a desired position by the number of stationary pole windings of said stepping motor, applying the calculated number of pulses plus a predetermined number of pulses to said stepping motor to move said driven object beyond said desired position and rotating said stepping motor in a reverse direction by said predetermined number of pulses to position said driven object to said desired position, whereby the driven object is linearly moved by a predetermined number of pitches by the linear movement of said motion translation means.

5. A positioning method according to one of claims 1 or 3, wherein said translation means includes a capstan rotatable in synchronism with said motor shaft of said stepping motor, said capstan including a circular outer periphery centered at said motor shaft, a carriage extending tangentially of said outer periphery of said capstan and carrying said driven object, a guide arm coupled to said carriage for linearly guiding said carriage tangentially of said capstan, and a belt wrapped around said capstan and having opposite ends thereof fixed to tangentially extending opposite ends of said capstan, said belt being adapted to be wound and unwound around said capstan when said capstan is rotated in synchronism with said stepping motor for linearly moving said carriage along said guide arm.

6. A positioning apparatus according to one of claims 2 or 4, wherein said translation means includes a capstan rotatable in synchronism with said motor shaft of said stepping motor, said capstain including a circular outer periphery centered at said motor shaft, a carriage extending tangentially of said outer periphery of said capstan and carrying said driven object, a guide arm coupled to said carriage for linearly guiding said carriage tangentially of said capstan, and a belt wrapped around said capstan and having opposite ends thereof fixed to tangentially extending opposite ends of said capstan, said belt being adapted to be wound and unwound around said capstan when said capstan is rotated in synchronism with said stepping motor for linearly moving said carriage along said guide arm.

7. A positioning method according to one of claims 1 or 3, wherein said translation means includes a capstan rotatable in synchronism with said motor shaft of said stepping motor, said capstan includes a circular outer periphery centered at said motor shaft, a carriage extending tangentially of said outer periphery of said capstan and carrying said driven object, a pulley having a rotatable circular outer periphery and spaced from said capstan in a direction of movement of said driven object, a guide arm for holding said driven object and linearly guiding said carriage in a direction of extension of said carriage, and a belt spanned in tension between said capstan and said pulley for linearly moving said carriage along said guide arm when said carriage is mounted between said capstan and said pulley and said stepping motor is rotated.

8. A positioning apparatus according to one of claims 2 or 4, wherein said motor translation means includes a capstan rotatable in synchronism with said motor shaft of said stepping motor, said capstan including a circular outer periphery centered at said motor shaft, a carriage extending tangentially of said outer periphery of said capstan and carrying said driven object, a pulley having a rotatable circular outer periphery and spaced from said capstan in a direction of movement of said driven object, a guide arm for holding said driven object and linearly guiding said carriage in a direction of extension of said carriage, and a belt spanned in tension between said capstan and said pulley for linearly moving said carriage along said guide arm when said carriage is mounted between said capstan and said pulley and said stepping motor is rotated.

9. A positioning method for a positioning apparatus including a stepping motor having a plurality of rotary poles mounted on a rotatable motor shaft, a plurality of stationary poles, and a plurality of stationary pole windings arranged around said rotary poles, said motor shaft being adapted to be rotated in a forward and a reverse direction in a stepwise manner each time said stationary pole windings are supplied with forward or reverse pulse currents, a capstan rotatable in synchronism with said motor shaft of said stepping motor, the capstan including a circular outer periphery centered at said motor shaft, a carriage means for carrying a driven object at one end thereof and for rotatably supporting the driven object around a rotary shaft at the other end thereof, and translation means for transmitting a rotational movement of said capstan by the rotation of said stepping motor to said rotary shaft mounted at the other end of said carriage means for moving said driven object by a predetermined number of pitches, the method comprising the steps of:

multiplying the number of pitches required for the driven object to be positioned to a desired position by the number of said stationary pole windings of said stepping motor to calculate the number of pulses for driving said stepping motor; applying the calculated number of pulses plus a predetermined number of pulses to said stepping motor to rotate said carriage means through said translation means to move said driven object beyond said desired position by said predetermined number of pulses; and applying a predetermined number of pulses of opposite polarity to said stepping motor to rotate said carriage means in a reverse direction to position said driven object to said desired position.

10. A positioning apparatus comprising a stepping motor for rotating a motor shaft stepwise in response to an application of pulse currents, and translation means for translating a motion of the motor shaft to increase a rotation of a capstan mounted on said motor shaft of said stepping motor, said translation means being adapted to move a driven object by a predetermined number of pitches;

the stepping motor includes a plurality of rotary poles mounted on the motor shaft, a plurality of stationary poles, and a plurality of stationary pole windings arranged around said rotary poles for rotating said motor shaft stepwise by a predetermined angle in response to an application of pulse currents to said stationary winding;

said capstan has a circular outer periphery centered at said motor shaft;

a carriage means for carrying said driven object at one end thereof and rotatably supporting said driven object around said rotary shaft at the other end thereof;

said translation means transmitting a rotational movement of said capstan for moving said driven object by the predetermined number of pitches; and control circuit means for multiplying the number of pitches required for said driven object to be positioned to a desired position by the number of said stationary pole windings to calculate the number of pulses for driving said stepping motor, for applying the calculated number of pulses plus a predetermined number of pulses to said stepping motor to rotate said carriage means through said translation means to move said driven object beyond said desired position by said predetermined number of pulses, and for applying a predetermined number of pulses of an opposite polarity to said stepping motor to rotate said carriage means in a reverse direction to position said driven object in said desired position.

11. A positioning method according to one of claims 1, 3, or 9, wherein said stepping motor includes at least four rotary poles, four stationary poles, and four stationary pole windings, and wherein the stepping motor is rotated four steps at a time.

12. A positioning apparatus according to one of claims 2, 4, or 10, wherein said stepping motor includes at least four rotary poles, four stationary poles, and four stationary pole windings, and wherein the stepping motor is rotated four steps at a time.

13. A positioning method according to one of claims 3 or 9, wherein said predetermined number of pulses to be added to said calculated number of pulses is one pulse, and wherein said stepping motor is overrun by one step and then rotated in a reverse direction by one step.

14. A positioning apparatus according to one of claims 4 or 10, wherein said predetermined number of pulses to be added to said calculated number of pulses is one pulse, and wherein said stepping motor is overrun by one step and then rotated in a reverse direction by one step.

15. A positioning method according to claim 9, wherein said capstan has a circular outer periphery centered at said motor shaft, the carriage extends tangentially to said outer periphery of said capstan and carries said driven object, a guide arm is coupled to said carriage for linearly guiding said carriage tangentially of said capstan, and a belt is wrapped around said capstan with opposite ends of said belt being fixed to tangentially extending opposite ends of said capstan, said belt being adapted to be wound and unwound around said capstan when said capstan is rotated for linearly moving said carriage along said guide arm.

16. A positioning apparatus according to claim 10, wherein said capstan has a circular outer periphery centered at said motor shaft, the carriage means extends tangentially to said outer periphery of said capstan and carries said driven object, a guide arm is coupled to said carriage means for linearly guiding said carriage means tangentially of said capstan, and a belt is wrapped around said capstan with opposite ends of said belt being fixed to tangentially extending opposite ends of said capstan, said belt being adapted to be wound and unwound around said capstan when said capstan is rotated for linearly moving said carriage means along said guide arm.

17. A positioning method according to one of claims 1 or 3, wherein said translation means includes a lead screw means rotatable in synchronism with said motor shaft of said stepping motor, said lead screw means having a cylindrical outer periphery extending radially of a magnetic disc, said lead screw means further including a screw engaging portion of a helical shape extending radially of said magnetic disc on said cylindrical outer periphery, a carriage means for carrying the driven object, said carriage means includes an engaging portion adapted to engage with said screw engaging portion of said lead screw means, and a guide arm means for guiding said carriage means radially of said magnetic disc.

18. A positioning method according to claim 17, wherein said screw engaging portion is a groove, and said engaging portion of said carriage means is a projection.

19. A positioning method according to claim 17, wherein said screw engaging portion is a projection, and said engaging portion of said carriage means is a groove.

20. A positioning apparatus, according to one of claims 2 or 4, wherein said translation means includes a lead screw means rotatable in synchronism with said motor shaft of said stepping motor, said lead screw means having a cylindrical outer periphery extending radially of a magnetic disc, said lead screw means further including a screw engaging portion of a helical shape extending radially of the driven object on said cylindrical outer periphery, a carriage means for carrying said driven object, said carriage means having an engaging portion adapted to be engaged with said screw engaging portion of said lead screw means, and a guide arm means for guiding said carriage means radially of said driven object.

21. A positioning apparatus according to claim 20, wherein said screw engaging portion of said lead screw means is a groove, and said engaging portion of said carriage means is a projection.

22. A positioning apparatus according to claim 20, wherein said screw engaging portion of said lead screw means is a projection, and said engaging portion of said carriage means is a groove.

* * * * *